D. M. ROSE.
END MATCHING MACHINE.
APPLICATION FILED OCT. 13, 1913.
1,095,234.
Patented May 5, 1914.
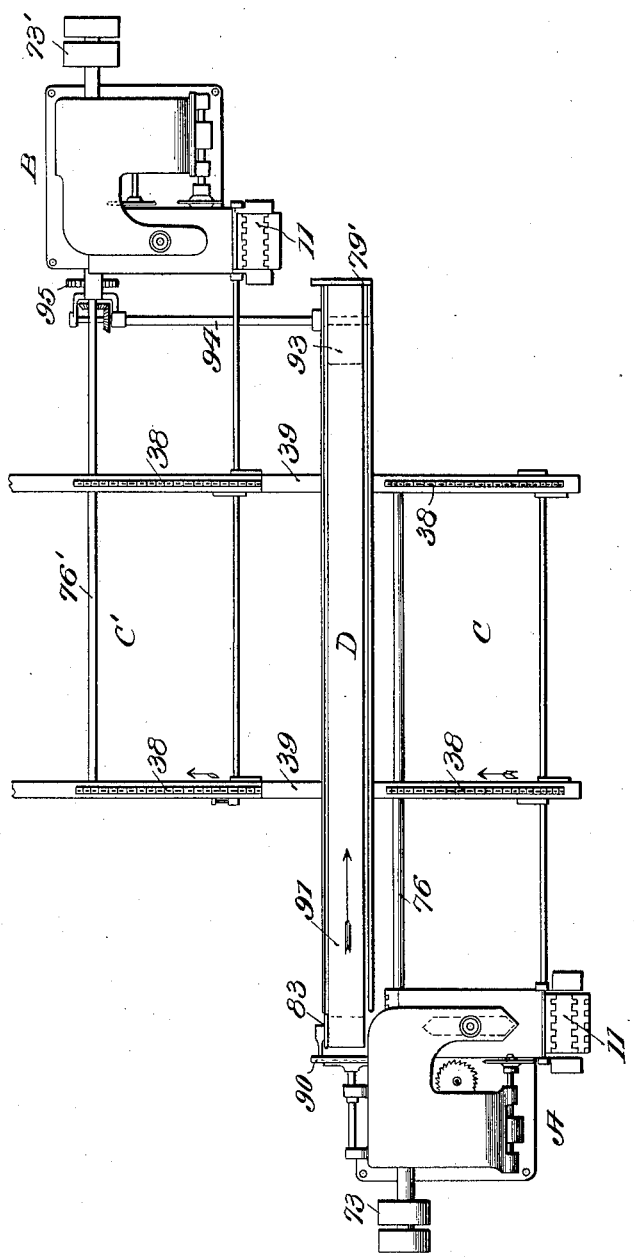

UNITED STATES PATENT OFFICE.

DANIEL M. ROSE, OF KNOXVILLE, TENNESSEE.

END-MATCHING MACHINE.

1,095,234.  Specification of Letters Patent.  Patented May 5, 1914.

Original application filed July 15, 1912, Serial No. 709,464. Divided and this application filed October 13, 1913. Serial No. 794,902.

*To all whom it may concern:*

Be it known that I, DANIEL M. ROSE, a citizen of the United States of America, and resident of Knoxville, Tennessee, have invented a new and useful Improvement in End-Matching Machines, which invention is fully set forth in the following specification.

In my companion application Serial No. 709,464, filed July 15th, 1912, of which this application is a division, I have described and claimed a tongue and groove machine adapted to seize and automatically position strips of different lengths on the carrier mechanism and successively advance the strips past trimming and matching cutters, whereby one end of the material is provided with a tongue or groove and the strip is automatically conveyed to another similar machine where the opposite end of the strip is matched.

The present invention relates more particularly to the carrier means for transporting strips of different lengths successively from one machine to the other, and comprises in combination a pair of end-matching machines adapted to operate in succession on the opposite ends of pieces of different lengths, and conveyers for advancing short pieces lengthwise from one machine to the other while advancing long pieces sidewise across the path of the short pieces for delivery to the second machine.

In order that the invention may be more readily understood, reference is had to the accompanying drawing which shows diagrammatically the system of carriers for transporting strips of different lengths from one end-matching machine to the second end-matching machine.

A designates, for instance, an end grooving machine and B an end tonguing machine located at a convenient distance from the first machine and at one side.

C, C' are chain carriers adapted to support the free ends of the long strips while the opposite ends are subjected to the operation of grooving and tonguing in passing through machines A and B in the direction of the short arrow.

D is a belt carrier for short pieces which are to be transported from the end grooving machine A to the end tonguing machine B in the direction of their lengths.

The end matching machines may be of any type, but preferably of the improved form which I have described and claimed in my above named application.

As illustrated, each carrier C, C' comprises a pair of endless chains 38 arranged parallel with each other and driven by shafts 76, 76' receiving power from the drive pulleys 73, 73' of their respective end matching machine. Each pair of chains 38 is located at the side of its corresponding machine and is adapted to support the free ends of the strips while the opposite ends are passed through the end matching machine by an advancing chain 11.

The end matching machine A is provided at its delivery end with a bracket-supported adjustable idle pulley 83, over which runs a carrier belt 91 for transporting short strips. The opposite end of this belt is supported by a pulley 93 fast to a shaft 94 driven through a gear train 95 from a drive pulley 73' of the second end matching machine. Just above and beyond the ends of the belt carrier 91 are provided supports 90 and 79' adapted to receive and support the ends of the long strips which are delivered thereon as they are pushed by the advancing pieces in their rear, the short pieces falling onto the carrier belt 91. In this manner the long strips are pushed over the path of the short strips into position to be again taken by the carrier C' which supports the free ends of the strips as they pass through the second machine B. Preferably, the strips are not pushed directly onto the carrier chains of the carrier C' but onto a pair of short parallel rails 39 in line with the chains, thereby enabling an operator standing in front of machine B to draw the advancing strips to one side and present their ends to the gripping device of the second end matching machine. The strips are then advanced through this machine with their free ends supported in the same manner as described above in connection with the carrier C. The same operator handles the short pieces delivered by the belt carrier D at a point near the front of the second machine and places them in position to be gripped and conveyed to the cutters.

It will thus be seen, without further description, that this system provides traveling supports which coöperate with the feed devices of the tonguing and grooving machines to advance long strips in a direction at right angles to the length of the long strips, and for transporting short strips in the direction of their lengths across the path of the former and to a point where the ends of both long and short strips may be presented to the second machine, through which both kinds of strips are carried in a manner similar to that of the first machine. The operator is thus enabled to handle long strips as readily as short strips and to increase the output of the matching machines without extra exertion on his part.

What is claimed is:—

1. In combination, a pair of end matching machines adapted to operate in succession on the opposite ends of pieces of different lengths, each machine being provided with a feed device, a carrier driven by the feed device of the machine for supporting the ends of the long strips, a conveyer for advancing short pieces lengthwise from one machine to the other, and stationary supports for the ends of the long pieces delivered from the first machine along which supports the long pieces are pushed over the path of the short pieces by strips advanced by the feed device of the first end matching machine.

2. In combination, a pair of end matching machines adapted to operate in succession on the opposite ends of pieces of different lengths, a conveyer for advancing short pieces lengthwise from one machine to the other, supports for the ends of the long pieces delivered from the first machine, said long pieces being advanced sidewise across the path of said short pieces for delivery to the second machine.

3. In combination, a pair of end matching machines adapted to operate in succession on the opposite ends of pieces of different lengths, a conveyer for advancing short pieces lengthwise from one machine to the other, said conveyer having driving connections with said second machine, supports for the ends of the long pieces delivered from the first machine, and means for advancing said long pieces sidewise along said supports across the path of said short pieces for delivery to the second machine.

4. In combination, a pair of end matching machines adapted to operate in succession on the opposite ends of pieces of different lengths, each machine being provided with means for advancing material therethrough, traveling supports intermediate the machines for supporting the ends of the long pieces as the opposite end passes through the machine, a conveyer for advancing short pieces lengthwise from one machine to the other, supports for the ends of the long pieces delivered thereon from the first machine, said long pieces being advanced on said supports over the path of said short pieces through displacement by pieces delivered by the first machine.

5. In combination, a pair of end matching machines adapted to operate in succession on the opposite end of pieces of different lengths, a conveyer for advancing short pieces lengthwise from one machine to the other, stationary supports for the ends of the long pieces delivered from the first machine, means for advancing said long pieces sidewise along said supports across the path of said short pieces for delivery to the second machine, and rails beyond said conveyer arranged in line with said carriers for supporting said advancing long strips while their ends are adjusted for entrance into said second machine.

6. In wood-working machinery adapted to operate upon pieces of different lengths and including a plurality of mechanisms one of which is a primary mechanism for operating at one end of said pieces of all lengths, means for advancing short pieces lengthwise from said primary mechanism to another mechanism, and means for advancing long pieces sidewise from said primary mechanism and presenting them in proper position to another mechanism operating at the other end, said means operating to advance said long pieces along a path across and in a different plane from that in which the short pieces are advanced lengthwise.

7. In combination, a pair of end-matching machines adapted to operate in succession on the ends of pieces of different lengths, means for separating short pieces from long pieces and for advancing said short pieces lengthwise from one machine to the other, and means for advancing long pieces sidewise from one machine in presenting them in proper relation to the other machine, said means operating to advance said long pieces along a path across and in a different plane from that in which the short pieces are advanced lengthwise.

In testimony whereof I have signed this specification in the presence of two subscribing witnesses.

DANIEL M. ROSE.

Witnesses:
P. D. DOYLE,
C. B. JOHNSON.